Sept. 28, 1948.   H. C. WENDT   2,450,320
VARIABLE AIR GAP TURN COMPENSATOR
Filed Sept. 27, 1946
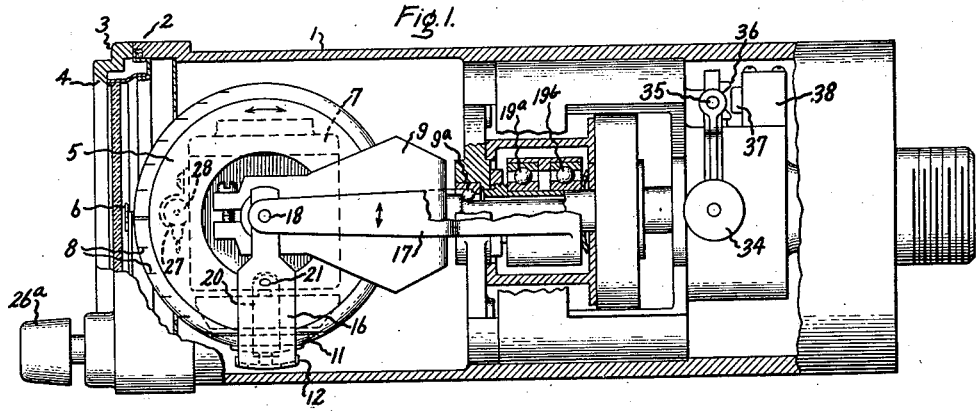
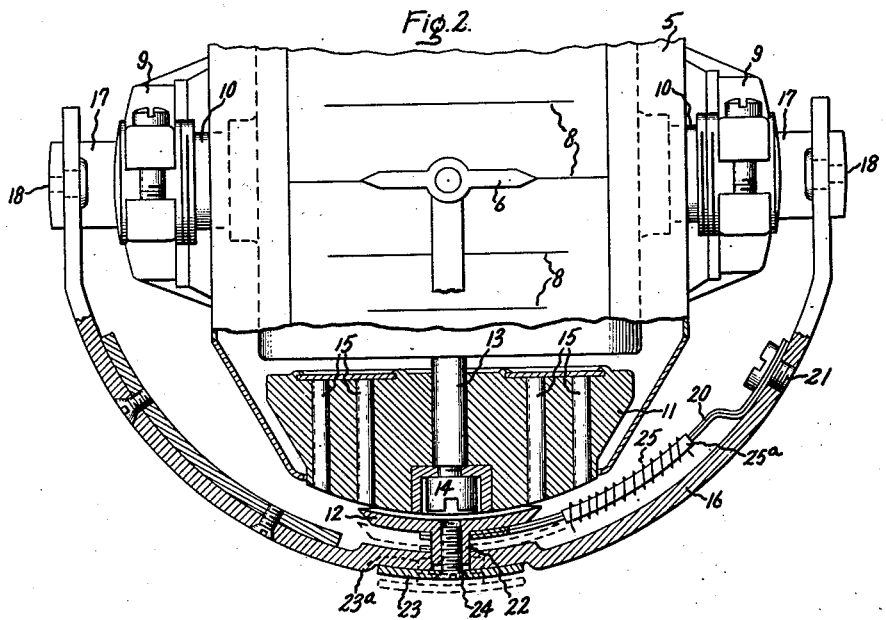
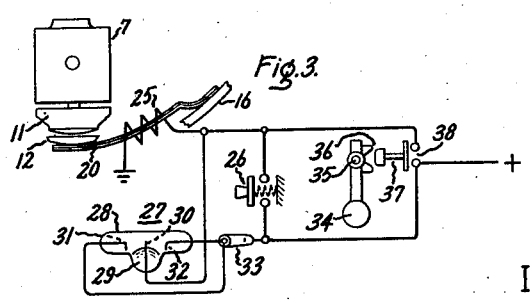
Inventor:
Harry C. Wendt,
by Clarke H. Nett
His Attorney.

Patented Sept. 28, 1948

2,450,320

UNITED STATES PATENT OFFICE 2,450,320

VARIABLE AIR GAP TURN COMPENSATOR

Harry C. Wendt, Lynnfield, Mass., assignor to General Electric Company, a corporation of New York Application September 27, 1946, Serial No. 699,904

11 Claims. (Cl. 74—5)

The present invention relates to gyroscopes and more particularly to a new and improved erection system for gyroscope of the vertical spin-axis type.

Gyroscopes of the vertical spin-axis type are used on vehicles such as ships and aircraft for indicating the attitude of the vehicle relative to a horizontal reference plane. Such gyroscopes are customarily provided with an erection system for precessing a gyroscope to a predetermined reference position relative to the direction of gravity as indicated by a gravity-responsive precession control device such as a pendulum.

Under certain conditions of operation the pendulum is subject to sideways acceleration and other forces so that is does not indicate the true vertical and during such times it is desirable to disable the erection system so that the gyroscope will not be precessed away from the true reference position. In connection with gyroscopes having magnetic erection systems this has been accomplished heretofore by using an electromagnet for providing the magnetic erecting force and providing switch means for deenergizing the electromagnet when the pendulum does not, for some reason, indicate the vertical. This system has the disadvantage that a failure of the electromagnet during normal operation, such as might be caused by a power failure or an inoperative control switch, means that the erection system becomes inoperative. This may be serious where a pilot is relying on the indication provided by the gyroscope to control an aircraft when the horizon is obscured.

An object of the invention is to provide a vertical gyroscope having a new and improved erection system.

A further object of the invention is to provide a gyroscope having an erection system which is electrically disabled but which operates in a normal manner in case the power supply for the disabling device fails, that is to say, the disabling device is "fail safe."

Another object of the invention is to provide a permanent magnet erection system for a gyroscope having electro-responsive means for disabling the erection system. Another object is to provide an improved gyroscope erection system having a control arrangement such that the system is disabled in the event that the mechanical limits of the control pendulum are exceeded.

A still further object of the invention is to provide an improved gyroscope erection system controlled in such a way that the erection system is disabled when the control pendulum is subjected to sideways acceleration tending to displace the pendulum from the true vertical.

Further objects and advantages of the invention will become apparent and the invention will be better understood from the following description referring to the drawing and the features of novelty which characterize the invention will be pointed out with particularity in the claims annexed to and forming a part of this specification.

In the drawing

Fig. 1 is a side elevation view, partly in section, of a universal attitude indicating instrument for aircraft having an erection system embodying the present invention.

Fig. 2 is the front view of a portion of the instrument shown in Fig. 1, partly in section, showing certain details of the erection system.

Fig. 3 is a diagrammatic view of the erection system showing the circuit connections of the electrical components thereof.

A preferred embodiment of my invention is illustrated in connection with a gyroscopic attitude-indicating instrument of the so-called stabilized ball or sphere type used to indicate the pitch and bank attitudes of an aircraft in flight. Referring to the drawing the instrument is shown as comprising a cylindrical frame 1 which is adapted to be inserted in an opening in the dashpanel of an aircraft so that the front portion 2 faces the pilot or other observer. Attached to the front of the frame is a face plate 3 having suitable apertures (not shown) adapted to receive mounting bolts by means of which the instrument is fastened to the dash panel. The face plate 3 has a circular opening 4 through which relative roll and pitch movements of a movable attitude indicator 5 and a relatively stationary miniature airplane 6 are observed. The attitude indicator 5 is supported on and stabilized by a gyroscope the rotor bearing frame of which is illustrated at 7. The gyroscope, which may be of conventional construction, comprises a rotating wheel (not shown) mounted in the bearing frame 7 so as to rotate about an approximately vertical spin axis. The gyroscope wheel is driven by a suitable electrical or pneumatic motor housed within the bearing frame 7. The attitude indicator 5, which is in the form of a circular shell, encircles the bearing frame 7 and has a center section, preferably spherical in contour, carrying suitable attitude indicating indicia which may be, as shown, in the form of a series of graduated horizontal lines 8. The pitch attitude of the aircraft is indicated by correspondence of one of the calibrated lines 8 with the miniature airplane 6 while the bank attitude of the aircraft is indicated by the angular displacement between the lines 8 and the miniature airplane.

For the purpose of universally supporting the gyroscope bearing frame 7, there is provided a yoke-shaped gimbal member 9 carrying at its forward end trunnions 10 which support the bearing frame for rotation about the transverse axis perpendicular to the spin axis of the gyroscope. The gimbal member 9 is supported by axially-spaced ball bearings, one of which is indicated at 9a, so that the gimbal is free to rotate about a longitudinal axis which is perpendicular to the transverse axis defined by the trunnions 10. With the instrument mounted on the aircraft dash-panel in the usual manner the longitudinal axis of the gimbal member 9 is parallel to or coincident with the fore and aft axis of the aircraft.

Due to friction in the gimbal bearings the gyroscope tends to wander from the reference position of the spin axis, which is approximately vertical, and for that reason it is necessary to provide an erection system for precessing the gyroscope to the reference position. In order that the erecting action will not be dependent for its operation upon an external electrical power supply, I prefer to use an eddy current erection system of the permanent magnet type such as the system disclosed and claimed in my copending application Serial No. 636,672, filed December 22, 1945, which is assigned to the same assignee as the present invention. The erection system is shown as comprising a rotating magnetic field producing element or member 11 and a cooperating, relatively stationary, current-conducting element or disk 12. The rotary element 11 is formed of a non-magnetic material and is rigidly secured to a gyroscope rotor shaft extension 13 by means of a screw 14 so that it rotates with the gyroscope. The rotary member 11 has embedded therein a series of permanent magnets 15 which are arranged in concentric circles having a center coincident with the axis of rotation of the shaft 13. The permanent magnets 15 provide a rotating magnetic field which induces eddy currents in the disk 12 which currents produce a magnetic field reacting on the gyroscope. The reaction torques, or drag torques, as they may be called, are such that they produce no net precession torque on the gyroscope when the axis of the disk 12 is in alignment with the axis of rotation of the member 11. However, if these axes become displaced there is a net torque applied to the gyroscope which causes it to precess to the position in which these axes become realigned.

In order that the disk 12 may be positioned by the force of gravity, it is arranged to be supported by a universal pendulum. The pendulum comprises a depending bail 16 which is pivotally supported on a second, yoke-shaped gimbal member 17 by means of trunnions 18. The gimbal 17 is supported by axially-spaced ball bearings 19a and 19b for rotation about an axis coaxial with the axis of rotation of the gimbal member 9. The gimbal members 9 and 17 are arranged in nested relation so that they are free to rotate relative to each other.

For the purpose of providing means for disabling the erection system at times when the pendulum 16 does not indicate the true vertical, there is provided an electroresponsive device for increasing the air gap between the current conducting disk 12 and the permanent magnets 15. In the illustrated arrangement this is accomplished by the provision of a bimetal strip 20, one end of which is rigidly secured to the pendulum or bail 16 by means of a screw 21. The opposite end of the bimetal strip carries the current conducting disk 12, the end being slotted to straddle a post 22 projecting downwardly from the disk through a central opening in bail 16. This arrangement permits a small amount of relative movement between the bimetal strip and the disk to accommodate the warping movement of the strip. The post 22 is secured to a movable plate 23 by means of an adjusting screw 24. The head of the screw 24 is secured to the plate 23 as by staking and the assembly is prevented from turning by a bent tab 23a which projects upwardly adjacent the side surface of bail 16. The plate 23 acts as a stop limiting the upward movement of the disk 12 to a normal position where the air gap between the disk and the magnets 15 is a minimum for maximum normal erecting action. The normal air gap can be adjusted by screw 24.

The bimetal strip is initially preloaded or stressed so that disk 12 is biased upwardly to the position in which plate 23 engages the underside of bail 16. The preloading is such that normal ambient temperature variations do not cause warping of the bimetal strip. The warping direction of the bimetal strip 20 is selected such that when the strip is heated to a predetermined temperature the lower free end of the strip moves downwardly carrying with it the current conducting disk 12 until the strip engages the upper surface of the bail 16, as shown by the dotted lines in Figure 2. In order to provide means for causing the bimetal strip 20 to warp downwardly there is provided an electric heating coil 25 which is wrapped around the central portion of the strip and insulated therefrom by a suitable insulating wrapper 25a. The heating coil 25 is energized from a suitable power source indicated by the plus and ground symbols in Fig. 3 of the drawing. When energized the free end of the bimetal strip 20 moves downwardly carrying with it the current conducting disk 12 so that the air gap between the disk 12 and the permanent magnet 15 is greatly increased. As a result of this increase in air gap, the erecting torque exerted on the gyroscope is reduced to a relatively small value so that the erection system is effectively disabled. This disabling of the erection system may be controlled either manually or automatically by switching means in the energization circuit of the bimetal strip heater 25, both manual and automatic arrangements being shown in Fig. 3 of the drawing. Referring to Fig. 3 it will be noted that there is provided a manually operated switch 26 which is connected between one terminal of the heater coil 25 and the positive side of the power supply. The switch 26 may for example be controlled by means of a knob 26a located on the front of the instrument. Thus, under manual operation, whenever the pilot wishes to disable the erection system during violent maneuvers to prevent errors of indication which would otherwise be caused by a swinging of the pendulum away from the true vertical position, he closes switch 26 energizing the heater coil 25 and causing the bimetallic strip 20 to move the disk 12 away from the magnets 15. When normal flight is resumed the switch 26 is opened, the bimetallic strip 20 cools, and the disk 12 is returned to its upward operative position.

One of the factors which may cause the pendulum 16 to swing away from the vertical position is a sideways centrifugal force which is exerted on the pendulum during turns of the aircraft. Under such conditions the disabling of the erection system may be made to occur automatically by means of a centrifugal switch which responds to this centrifugal force and closes a circuit to energize the heater coil 25. Such a centrifugal switch is indicated generally at 27 in Figs. 1 and 3 of the drawing. The centrifugal switch is shown as comprising a capsule 28 containing a globule of mercury 29 which completes an electrical circuit between a center electrode 30 and either of two electrodes 31 and 32 located at opposite ends of the capsule depending on which end of the capsule is occupied by the globule of mercury. The arrangement is such that when the capsule 28 is level and is subject to no sideways acceleration force, the mercury occupies a center position and does not touch either of the end electrodes 31 or 32. However, when the capsule is subjected to a sideways centrifugal force the mercury globule completes the circuit between electrode 30 and the electrode 31 or 32 depending on the direction the mercury has rolled under the influence of centrifugal force. In order that the capsule 28 may be maintained in a level position and be affected only by centrifugal action encountered during turns, it is mounted on and supported by the rotor bearing frame 7 of the gyroscope so that it is maintained level by the gyroscope in a position parallel to the transverse axis of the aircraft. As shown in Fig. 3 the end electrodes 31 and 32 are tied together and connected to one side of the power supply while the center electrode 31 is connected to the one terminal of the coil 25. Thus whenever a connection is made between the center electrode 30 and either of the other electrodes 31 or 32, as occurs during a turn of the aircraft, a circuit is completed energizing the heater coil 25. This moves the disk 12 away from the magnets 15 so that acceleration errors do not result in a precession of the gyroscope away from the true reference position.

When the gyroscope motor is initially started the gyroscope bearing frame 7 is usually tilted from the vertical so that a circuit may be completed through the centrifugal switch 27. During the initial starting period it is desirable to have the erection system in operation so that the gyroscope will erect itself to the vertical reference position. In order to accomplish this there is provided an auxiliary cutout switch 33 which is connected in series with the circuit through the centrifugal switch 27. During starting of the gyroscope the switch 33 is opened to prevent the operation of the centrifugal switch from disabling the erection system. After the gyroscope has come up to speed and is erected to the vertical position so that the circuit to the centrifugal switch is open, the switch 33 is then closed so that the centrifugal switch becomes effective to disable the erection system during turns, as described above.

Another factor which may cause the pendulum 16 to be moved away from the true vertical position is the fact that the freedom of movement of the pendulum is necessarily limited because of structural limitations of the instrument. Thus for example in the instrument shown it will be apparent that for dives of the aircraft beyond about 25 degrees, the pendulum 16 will be rotated about the trunnions 18 until it is engaged and displaced by the gimbal member 9. During this condition it is desirable that the erection system be disabled and I have shown an arrangement by means of which this may be accomplished automatically. For this purpose there is provided a second pendulum 34 pivoted at 35 on the frame for rotation about an axis parallel to the transverse action of the aircraft. Thus the pendulum 34 swings in a manner similar to the pendulum 16. The pendulum 34 has attached thereto camming surfaces 36 which are arranged to engage and operate a switching member 37 to close switch 38 at dive and climb angles of the aircraft slightly less than those which cause the pendulum 16 to engage its stops. As shown in Fig. 3 the switch 38 is connected in parallel with the manually operated switch 26 and the centrifugally operated switch 27 and acts to energize the heater coil 25 and disable the erection system whenever the switch is closed by operation of the pendulum 34. The switch 38 is biased to the open position by spring means not shown so that it is opened when the pendulum 34 swings back to the center position.

The pendulum 34 also closes switch 38 to disable the erection system during accelerations or decelerations of the aircraft exceeding a predetermined value such as 0.3 g. Such accelerations and decelerations would, of course, affect the erecting pendulum and cause an erection error.

In view of the foregoing it will be apparent that I have provided an erection system which functions in a normal manner independently of any external power supply but which can be effectively disabled by an electroresponsive device. If the power supply should fail, the bimetal strip 20 always functions, upon cooling, to restore the current-conducting disk 12 to its normal, minimum-airgap position. In this position the erection system operates in a normal maner subject only to the errors caused by conditions resulting in a swinging of the erecting pendulum 16, from the true vertical position.

An additional advantage of the permanent magnet erection system of the type illustrated is that it is considerably lighter and more compact than an equivalent electromagnetic type. Therefore my novel erection cutout system, which permits the use of a permanent magnet system, is advantageous from this standpoint as well as the "fail safe" consideration.

The automatic erection cutout during turns affected by operation of the centrifugal switch 27 and during steep climbs and dives affected by the second pendulum 34, gives automatic operation of the erection cutout as required so that the instrument requires a minimum of attention from the pilot.

Modifications of the particular arrangements which I have disclosed embodying my invention will occur to those skilled in the art, so that I do not desire my invention to be limited to the particular arrangements set forth and I intend in the appended claims to cover all modification which do not depart from the spirit and scope of my invention.

What I claim as new and desire to secure by Letters Patent of the United States is:

1. In combination, a universally mounted gyroscope, a universally mounted pendulum, an erection system comprising a magnetic element and a cooperating current conducting element, one of said elements being mounted on said gyroscope and the other being mounted on said pendulum, means for rotating one of said elements whereby eddy currents are induced in said current conducting element resulting in an erecting torque on said gyroscope, and means for reducing said erecting torque to a relatively ineffective value comprising an electroresponsive device for increasing the spacing between said elements.

2. In combination with a universally mounted gyroscope, an erection system for precessing the gyroscope to maintain the spin thereof in an approximately vertical position comprising a magnetic field producing element and a cooperating current conducting element, one of said elements being mounted on said gyroscope and the other being mounted on a universal pendulum, means for rotating one of said elements so that with a normal spacing between said elements eddy currents are induced in the current conducting element resulting in a normal erecting torque which processes the gyroscope to a predetermined position relative to said pendulum, and means for reducing the erecting torque comprising an electroresponsive device operative when energized to increase the distance between said elements beyond said normal spacing and means for controlling the energization of said electroresponsive device.

3. In combination with a universally mounted gyroscope, an erection system for precessing the gyroscope to maintain the spin axis thereof in an approximately vertical position comprising a magnetic field producing element and a cooperating current conducting element, one of said elements being mounted on said gyroscope and the other being mounted on a universal pendulum, means for rotating one of said elements so that with a normal spacing between said elements eddy currents are induced in the current conducting element resulting in a normal erecting torque which precesses the gyroscope to a predetermined position relative to said pendulum, and means for reducing the erecting torque comprising an electroresponsive device operative when energized to increase the distance between said elements beyond said normal spacing and means for controlling the energization of said electroresponsive device comprising a switch and a second pendulum for controlling said switch.

4. In combination, a universally mounted gyroscope, a universally mounted pendulum, an erection system comprising a magnetic element and a cooperating current-conducting element, one of said elements being mounted on said gyroscope and the other being mounted on said pendulum, means for rotating one of said elements whereby eddy currents are induced in said current-conducting element resulting in an erecting torque on said gyroscope, and means for reducing said erecting torque to an ineffective value comprising an electroresponsive device for increasing the spacing between said elements, said electroresponsive device comprising a bimetal member arranged to position one of said elements by a change in curvature of said member and an electric heater for heating said bimetal member.

5. In combination, a universally mounted gyroscope, a universally mounted pendulum, an erection system comprising a rotating magnetic field producing element mounted on said gyroscope, a current conducting disk mounted on said pendulum so as to be movable towards and away from said magnet member to vary the erecting torque exerted on said gyroscope, electroresponsive means for biasing said erecting disk toward said magnetic field producing element and for moving said disk away from said magnetic field producing element, and means for controlling the energization of said electroresponsive means.

6. In combination a universally mounted gyroscope, a universally mounted pendulum, an erection system comprising a rotating magnetic field producing element mounted on said gyroscope, a bimetal member mounted on said pendulum, a current conducting disk carried by said bimetal member and arranged to move towards and away from said magnetic field producing element in response to a change in curvature of said bimetal member, and an electric heater for effecting a change of curvature of said bimetal member.

7. In combination, a universally mounted gyroscope, a universally mounted pendulum, an erection system comprising a magnetic element and a cooperating current conducting element, one of said elements being mounted on said gyroscope and the other being mounted on said pendulum, means for rotating one of said elements whereby eddy currents are induced in said current conducting element resulting in an erecting torque on said gyroscope, means for reducing said erecting torque to a relatively ineffective value comprising an electroresponsive device for increasing the spacing between said elements, and a centrifugal switch mounted on and stabilized by said gyroscope for controlling said electroresponsive device.

8. In combination, a universally mounted gyroscope, a universally mounted pendulum, an erection system comprising a magnetic element and a cooperating current conducting element, one of said elements being mounted on said gyroscope and the other being mounted on said pendulum, means for rotating one of said elements whereby eddy currents are induced in said current conducting element resulting in an erecting torque on said gyroscope, means for reducing said erecting torque to a relatively ineffective value comprising an electroresponsive device for increasing the spacing between said elements, a second pendulum mounted to swing under conditions causing a similar swing of said universal pendulum, and switching means actuated by said second pendulum for controlling said electroresponsive device.

9. In combination, a universally mounted gyroscope, a universally mounted pendulum, an erection system comprising a magnetic element and a cooperating current conducting element, one of said elements being mounted on said gyroscope and the other being mounted on said pendulum, means for rotating one of said elements whereby eddy currents are induced in said current conducting element resulting in an erecting torque on said gyroscope, means for reducing said erecting torque to a relatively ineffective value comprising an electroresponsive device for increasing the spacing between said elements, a pair of parallel connected switching devices connected to control said electroresponsive device, a centrifugal switch mounted on and stabilized by said gyroscope comprising one of said switching devices, and a second pendulum, mounted to swing under conditions causing a similar swing of said universal pendulum, cooperating with a switch comprising the other of said switching devices.

10. In combination, a universally mounted gyroscope, a universally mounted pendulum, an erection system comprising an element mounted on said gyroscope and a cooperating torque applying element mounted on said pendulum, electroresponsive means for disabling said erection system, and an acceleration-responsive, current controlling device mounted on and stabilized by said gyroscope for controlling said electroresponsive means.

11. In combination, a universally mounted gyroscope, a universally mounted pendulum, an erection system comprising an element mounted on said gyroscope and a cooperating torque applying element mounted on said pendulum, electroresponsive means for disabling said erection system, a pair of current controlling devices for jointly controlling said electroresponsive means, acceleration responsive switching means mounted on and stabilized by said gyroscope comprising one of said current controlling devices, and a second pendulum, mounted to swing under conditions causing a similar swing of said universal pendulum, cooperating with a switch comprising the other of said current controlling devices.

HARRY C. WENDT.

REFERENCES CITED

The following references are of record in the file of this patent:

UNITED STATES PATENTS

| Number    | Name              | Date          |
|-----------|-------------------|---------------|
| 1,934,774 | Sperry, Jr., et al. | Nov. 14, 1933 |
| 2,339,606 | Sias              | Jan. 18, 1944 |
| 2,428,925 | Bosell            | Oct. 14, 1947 |